(12) United States Patent
Dimpsey et al.

(10) Patent No.: US 8,196,115 B2
(45) Date of Patent: *Jun. 5, 2012

(54) METHOD FOR AUTOMATIC DETECTION OF BUILD REGRESSIONS

(75) Inventors: Robert Tod Dimpsey, Austin, TX (US); Frank Eliot Levine, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 960 days.

This patent is subject to a terminal disclaimer.

(21) Appl. No.: 12/172,791

(22) Filed: Jul. 14, 2008

(65) Prior Publication Data

US 2008/0270995 A1 Oct. 30, 2008

Related U.S. Application Data

(63) Continuation of application No. 10/777,743, filed on Feb. 12, 2004, now Pat. No. 7,496,900.

(51) Int. Cl.
*G06F 9/44* (2006.01)

(52) U.S. Cl. ........ 717/128; 717/126; 717/127; 717/130; 717/131

(58) Field of Classification Search ................... None
See application file for complete search history.

(56) References Cited

U.S. PATENT DOCUMENTS

| | | | |
|---|---|---|---|
| 5,950,003 A | 9/1999 | Kaneshiro et al. | |
| 5,963,739 A | 10/1999 | Homeier | |
| 6,003,143 A * | 12/1999 | Kim et al. | 714/38.13 |
| 6,011,918 A | 1/2000 | Cohen et al. | |
| 6,055,492 A | 4/2000 | Alexander, III et al. | |
| 6,247,170 B1 | 6/2001 | Giroux | |
| 6,282,701 B1 * | 8/2001 | Wygodny et al. | 717/125 |
| 6,338,159 B1 * | 1/2002 | Alexander et al. | 717/128 |
| 6,349,406 B1 | 2/2002 | Levine et al. | |
| 6,557,167 B1 * | 4/2003 | Thelen | 717/127 |
| 6,751,789 B1 * | 6/2004 | Berry et al. | 717/130 |
| 6,754,890 B1 * | 6/2004 | Berry et al. | 717/128 |
| 6,765,990 B2 | 7/2004 | Freedman et al. | |

(Continued)

OTHER PUBLICATIONS

Srivastava et al., "Effectively Prioritizing Tests in Development Environment", ACM SIGSOFT Software Engineering Notes archive, vol. 27, Issue 4 (Jul. 2002) Microsoft Research, pp. 97-106, WA.

(Continued)

*Primary Examiner* — Isaac Tecklu

(74) *Attorney, Agent, or Firm* — Yee & Associates, P.C.; David A. Mims, Jr.

(57) ABSTRACT

A method and apparatus for automatically performing regression processing on trace data are provided. With the apparatus and method, call tree data structures are generated for two or more executions of two or more builds of a computer program. The apparatus and method perform a "tree-minimization" operation on each set of call tree data structures for each of the builds to generate minimized call tree data structures for each build of the computer program. The minimized call tree data structures are then subtracted from one another to generate a subtracted minimized call tree data structure. From this subtracted minimized call tree data structure, the portions of the computer program that are different from build to build and which appreciably and consistently affect the difference in execution of the computer program from build to build may be identified. Thus, the analyst's attention is directed to these areas of the computer program code which may be optimized in order to obtain better execution of the computer program.

11 Claims, 9 Drawing Sheets

U.S. PATENT DOCUMENTS

| | | | |
|---|---|---|---|
| 6,857,120 B1 * | 2/2005 | Arnold et al. | 717/157 |
| 6,904,594 B1 | 6/2005 | Berry et al. | |
| 6,978,401 B2 * | 12/2005 | Avvari et al. | 714/38.13 |
| 7,007,270 B2 * | 2/2006 | Martin et al. | 717/131 |
| 7,103,530 B1 | 9/2006 | Bartz et al. | |
| 7,243,342 B2 | 7/2007 | Ghiya et al. | |
| 7,246,290 B1 | 7/2007 | Green et al. | |
| 7,260,692 B1 | 8/2007 | Zahavi et al. | |
| 7,299,319 B2 | 11/2007 | Dimpsey et al. | |
| 7,389,497 B1 * | 6/2008 | Edmark et al. | 717/130 |
| 7,496,900 B2 | 2/2009 | Dimpsey et al. | |
| 7,505,953 B2 | 3/2009 | Doshi | |
| 7,506,330 B2 | 3/2009 | Alexander, III et al. | |
| 7,519,953 B2 | 4/2009 | Reissman et al. | |
| 7,519,961 B2 * | 4/2009 | Alexander et al. | 717/133 |
| 7,536,680 B2 | 5/2009 | Berry et al. | |
| 8,015,406 B2 | 9/2011 | Lonardo et al. | |
| 2003/0051122 A1 | 3/2003 | Sato | |
| 2003/0192034 A1 | 10/2003 | Hayase | |
| 2004/0031020 A1 * | 2/2004 | Berry et al. | 717/130 |
| 2004/0078789 A1 | 4/2004 | Ghiya et al. | |
| 2005/0010578 A1 * | 1/2005 | Doshi | 707/100 |
| 2005/0071818 A1 * | 3/2005 | Reissman et al. | 717/127 |
| 2005/0183067 A1 | 8/2005 | Dimpsey et al. | |
| 2005/0183070 A1 | 8/2005 | Alexander, III et al. | |
| 2005/0183074 A1 | 8/2005 | Alexander, III et al. | |
| 2005/0183075 A1 | 8/2005 | Alexander, III et al. | |
| 2005/0210452 A1 | 9/2005 | Dimpsey et al. | |
| 2005/0257199 A1 * | 11/2005 | Johansson et al. | 717/126 |
| 2009/0044174 A1 * | 2/2009 | Dolby et al. | 717/127 |

OTHER PUBLICATIONS

Young et al., "Better Global Scheduling Using Path Profiles", Proccedings, 31st Annual ACMIIEEE International Symposium on Microarchitecture, 1998, pp. 115-123, IEEE Computer Society Press Los Alamitos, CA, USA.

Bhargava et al., "Improving Dynamic Cluster Assignment for Clustered Trace Cache Processors", Proceedings of the 30th Annual International Symposium on Computer Architecture, 2003, pp. 264-274, IEEE.

Zhang et al., "Whole Execution Traces", 37th International Symposium on Microarchitecture, 2004, pp. 105-116, IEEE.

Kazi et al., "Javiz: A Client/Server Java Profiling Tool", IBM Systems Journal 39, No. 1, 2000, pp. 96-117.

Alexander et al., "A Unifying Approach to Performance Analysis in the Java Environment", IBM Systems Journal, vol. 39, No. 1, 2000, pp. 118-134.

USPTO Office Action regarding U.S. Appl. No. 10/777,872, dated Oct. 23, 2007.

USPTO Final Office Action regarding U.S. Appl. No. 10/777,872, dated Apr. 10, 2008.

USPTO Notice of Allowance regarding U.S. Appl. No. 10/777,872, dated Nov. 4, 2008.

USPTO Office Action regarding U.S. Appl. No. 10/777,742, dated Jun. 18, 2007.

USPTO Final Office Action regarding U.S. Appl. No. 10/777,742, dated Dec. 11, 2007.

USPTO Appeal Brief regarding U.S. Appl. No. 10/777,742, dated Jul. 7, 2008.

USPTO Notice of Allowance regarding U.S. Appl. No. 10/777,742, dated Sep. 26, 2008.

USPTO Notice of Allowance regarding U.S. Appl. No. 10/777,742, dated Dec. 4, 2008.

USPTO Office Action regarding U.S. Appl. No. 10/777,909, dated Dec. 7, 2007.

USPTO Final Office Action regarding U.S. Appl. No. 10/777,909, dated Jul. 22, 2008.

USPTO Appeal Brief regarding U.S. Appl. No. 10/777,909, dated Dec. 9, 2008.

USPTO Examiner's Answer regarding U.S. Appl. No. 10/777,909, dated Mar. 19, 2009.

USPTO Reply Brief regarding U.S. Appl. No. 10/777,909, dated Apr. 16, 2009.

USPTO Decision on Appeal regarding U.S. Appl. No. 10/777,909, dated Aug. 17, 2011.

USPTO Notice of Allowance regarding U.S. Appl. No. 10/777,909, dated Sep. 14, 2011.

USPTO Office Action regarding U.S. Appl. No. 10/777,743, dated Apr. 4, 2008.

USPTO Notice of Allowance regarding U.S. Appl. No. 10/777,743, dated May 5, 2008.

\* cited by examiner

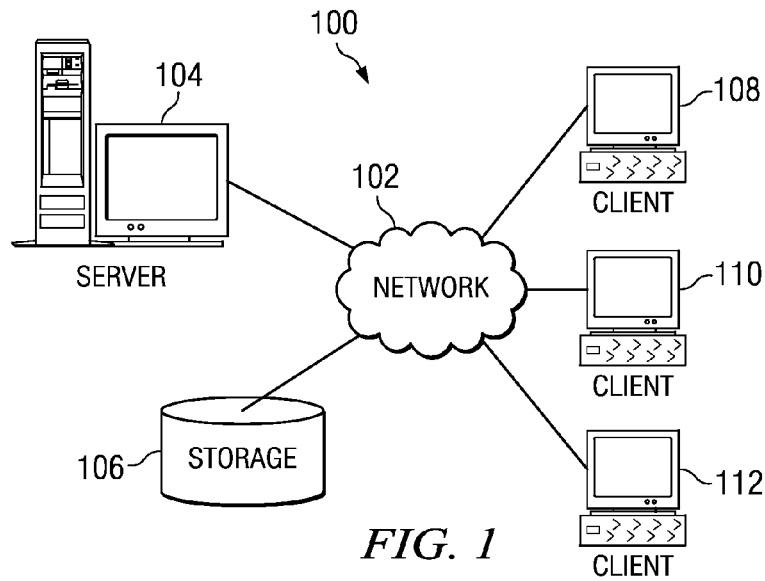
FIG. 1
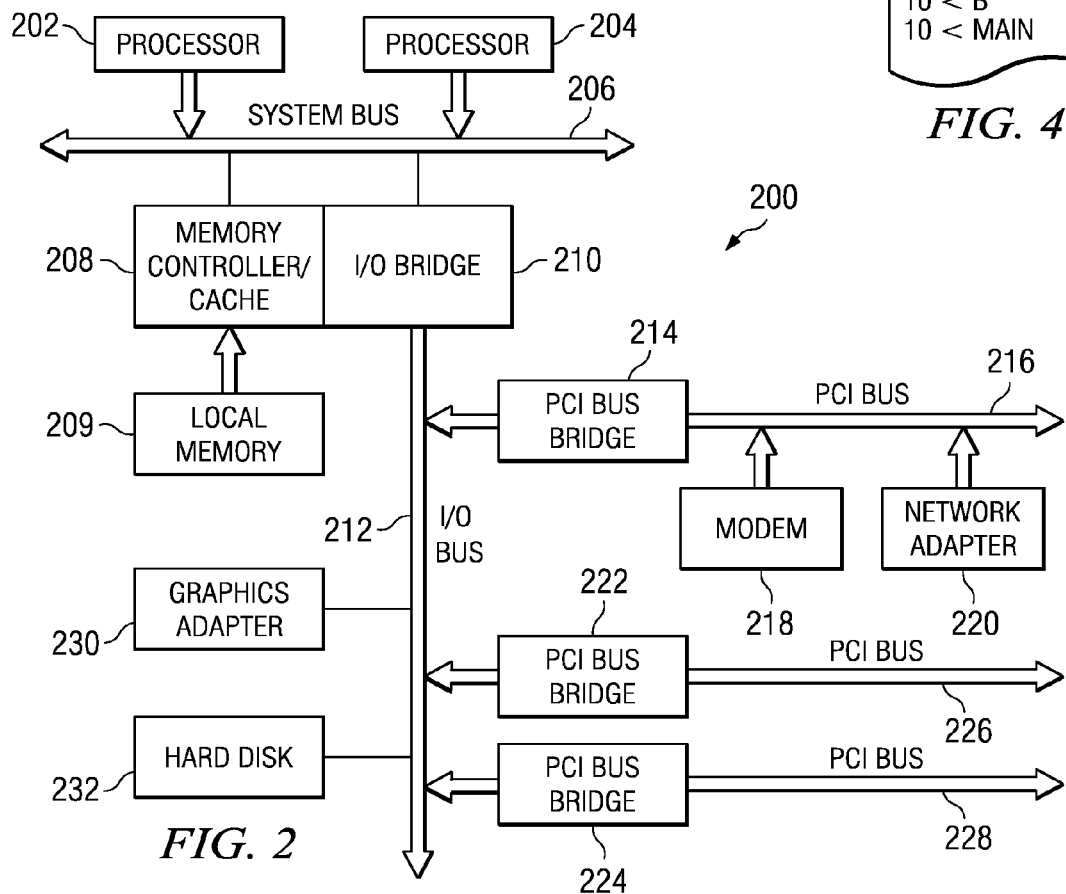
FIG. 2
```
0 AC_test_pidtid
0 > MAIN
0 > A
1 > B
2 < B
2 > B
3 > C
4 < C
4 < B
4 < A
4 > B
5 > A
6 > C
7 < C
7 > X
7 > E
8 < E
8 > F
9 < F
9 > G
10 < G
10 < X
10 < A
10 < B
10 < MAIN
```
FIG. 4

| SOURCE | CALLS | %BASE | %CUM | FUNCTION |
|--------|-------|-------|------|----------|
| SELF | 1 | 0.00 | 100.00 | [0] AC_test_pidtid |
| CHILD | 1 | 0.00 | 100.00 | MAIN |
| PARENT | 1 | 0.00 | 100.00 | AC_test_pidtid |
| SELF | 1 | 0.00 | 100.00 | [1] MAIN |
| CHILD | 1 | 10.00 | 60.00 | B |
| CHILD | 1 | 10.00 | 40.00 | A |
| PARENT | 2 | 20.00 | 30.00 | A |
| PARENT | 1 | 10.00 | 60.00 | MAIN |
| SELF | 3 | 30.00 | 90.00 | [2] B |
| CHILD | 1 | 10.00 | 50.00 | A |
| CHILD | 1 | 10.00 | 10.00 | C |
| PARENT | 1 | 10.00 | 40.00 | MAIN |
| PARENT | 1 | 10.00 | 50.00 | B |
| SELF | 2 | 20.00 | 90.00 | [3] A |
| CHILD | 2 | 20.00 | 30.00 | B |
| CHILD | 1 | 0.00 | 30.00 | X |
| CHILD | 1 | 10.00 | 10.00 | C |
| PARENT | 1 | 0.00 | 30.00 | A |
| SELF | 1 | 0.00 | 30.00 | [4] X |
| CHILD | 1 | 10.00 | 10.00 | E |
| CHILD | 1 | 10.00 | 10.00 | G |
| CHILD | 1 | 10.00 | 10.00 | F |
| PARENT | 1 | 10.00 | 10.00 | A |
| PARENT | 1 | 10.00 | 10.00 | B |
| SELF | 2 | 20.00 | 20.00 | [5] C |
| PARENT | 1 | 10.00 | 10.00 | X |
| SELF | 1 | 10.00 | 10.00 | [6] E |
| PARENT | 1 | 10.00 | 10.00 | X |
| SELF | 1 | 10.00 | 10.00 | [7] F |
| PARENT | 1 | 10.00 | 10.00 | X |
| SELF | 1 | 10.00 | 10.00 | [8] G |

*FIG. 6*

```
TOTAL: 10 CPU SECONDS
Lv   RL   CALLS     %BASE      %CUM       INDENT HkKey_HkName
0    1    1         0.00       100.00     AC_test_pidtid
1    1    1         0.00       100.00     - MAIN
2    1    1         10.00      40.00      --A
3    1    2         20.00      30.00      ---B
4    1    1         10.00      10.00      ----C
2    1    1         10.00      60.00      --B
3    1    1         10.00      50.00      ---A
4    1    1         10.00      10.00      ----C
4    1    1         0.00       30.00      ----X
5    1    1         10.00      10.00      ----+E
5    1    1         10.00      10.00      ----+F
5    1    1         10.00      10.00      ----+G
```
*FIG. 7*
TRACE DATA FOR
EXECUTION OF FIRST BUILD
OF COMPUTER PROGRAM
```
0 pidtid   xyz
3 > A
2 > B
7 < B
1 > C
5 > D
7 < D
```
*FIG. 8A*
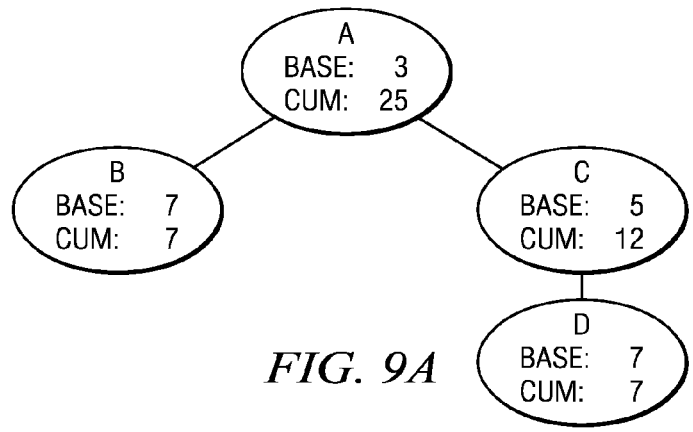
*FIG. 9A*
TRACE DATA FOR
EXECUTION OF SECOND BUILD
OF COMPUTER PROGRAM
```
0 pidtid   xyz
3 > A
2 > B
7 < B
1 > C
5 > E
6 < E
```
*FIG. 8B*
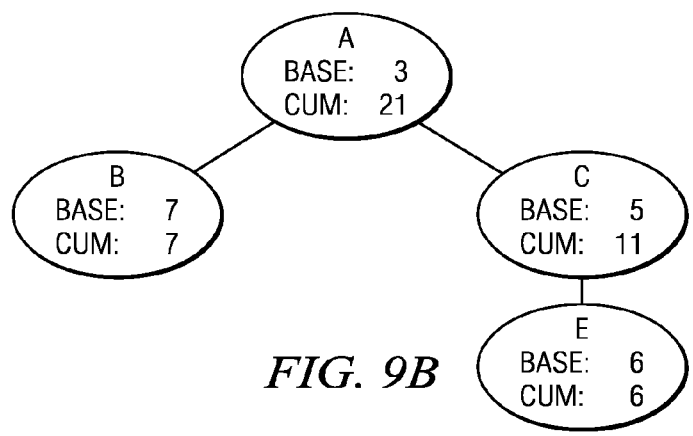
*FIG. 9B*

```
TOTAL: 25 CPU SECONDS
Lv  RL  CALLS  %BASE   %CUM   BASE  CUM  INDENT HkKey_HkName
0   1   2      12.00   100.00  3    25   xyz_pidtid
1   1   1      12.00   88.00   3    22   - A
2   1   1      28.00   28.00   7    7    --B
2   1   1      20.00   48.00   5    12   --C
3   1   1      28.00   28.00   7    7    ---D
```

*FIG. 10A*

```
TOTAL: 24 CPU SECONDS
Lv  RL  CALLS  %BASE   %CUM   BASE  CUM  INDENT HkKey_HkName
0   1   2      12.50   100.00  3    24   xyz_pidtid
1   1   1      12.50   87.50   3    21   - A
2   1   1      29.17   29.17   7    7    --B
2   1   1      20.83   45.83   5    11   --C
3   1   1      25.00   25.00   6    6    ---E
```

A
BASE: 0  PASS: 3
CUM:  1
CUMA: 13

C
BASE: 0  PASS: 3
CUM:  1
CUMA: 13

D
BASE: 7  PASS: 1
CUM:  7
CUMA: 7

E
BASE: -6  PASS: 2
CUM:  -6
CUMA: 6

```
TOTAL: 25 CPU SECONDS IN TREE A USED AS BASE FOR PERCENTAGES
Lv  RL  CALLS  %BASE    %CUM    BASE  CUM  CumA  PASS  INDENT HkKey_HkName
0   1   0      0.00     4.00    0     1    13          difference_pidtid
1   1   0      0.00     4.00    0     1    13    3     - A
2   1   0      0.00     4.00    0     1    13    3     --C
3   1   1      28.00    28.00   7     7    7     1     ---D
3   1   -1     -24.00   -24.00  -6    -6   6     2     ---E
```

*FIG. 12*

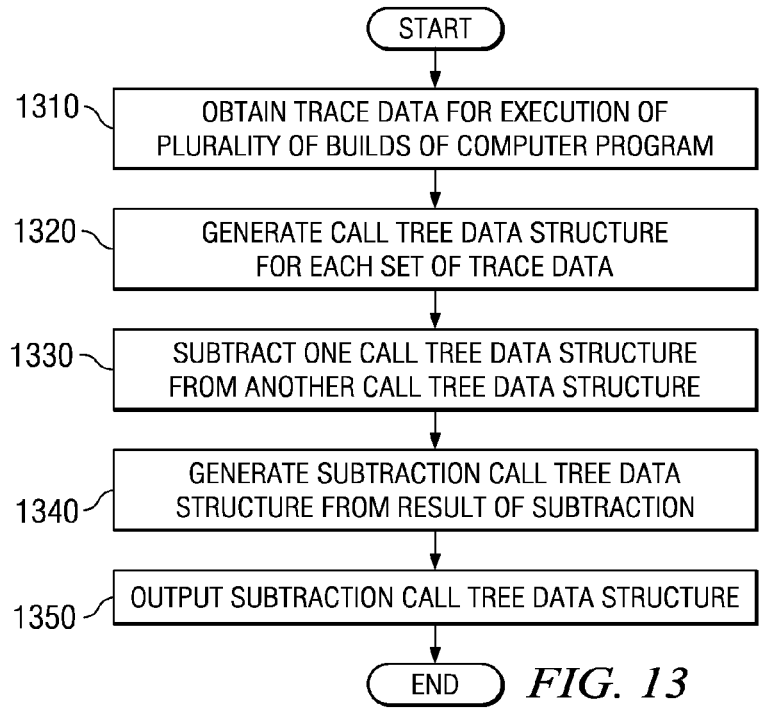
FIG. 13
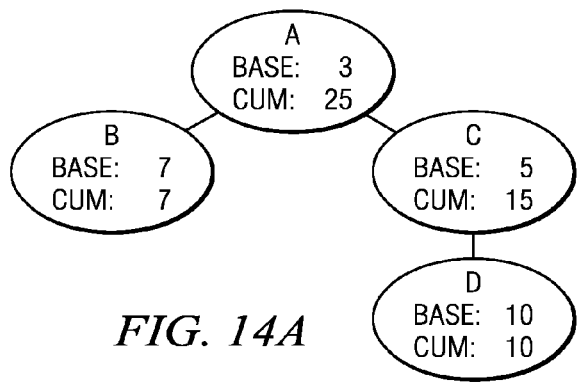
FIG. 14A
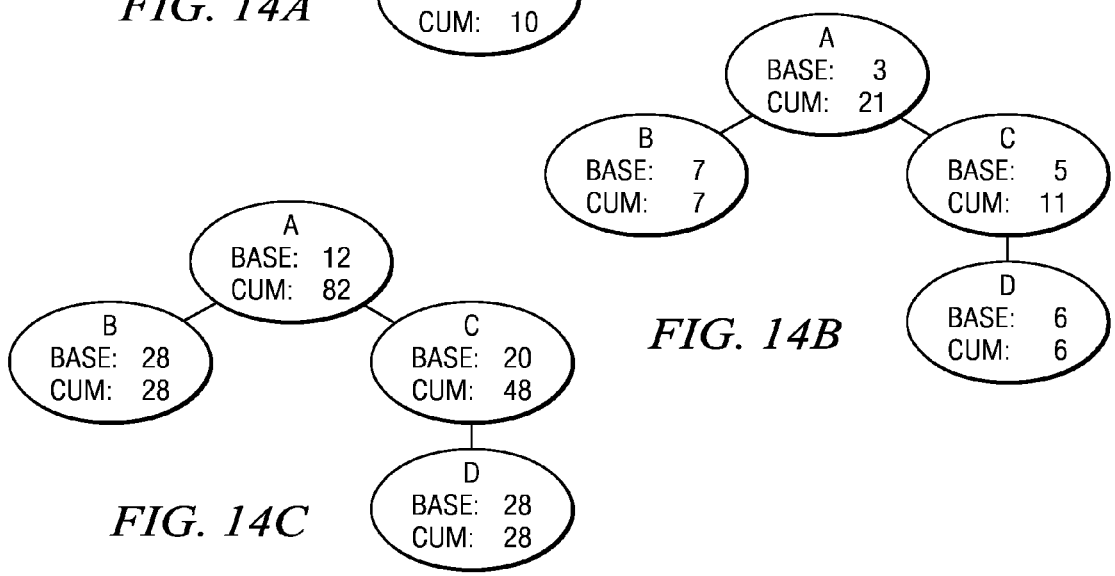
FIG. 14B
FIG. 14C

| Lv | RL | CALLS | %BASE | %CUM | BASE | CUM | CumA | INDENT HkKey_HkName |
|---|---|---|---|---|---|---|---|---|
| 0 | 1 | 3 | 12.16 | 100.00 | 9 | 74 | 74 | bigtree_pidtid |
| 1 | 1 | 3 | 12.16 | 87.84 | 9 | 65 | 65 | - A |
| 2 | 1 | 3 | 28.38 | 28.38 | 21 | 21 | 21 | --B |
| 2 | 1 | 3 | 20.27 | 47.30 | 15 | 35 | 35 | --C |
| 3 | 1 | 2 | 18.92 | 18.92 | 14 | 14 | 14 | ---D |
| 3 | 1 | 1 | 8.11 | 8.11 | 6 | 6 | 6 | ---E |

METHOD FOR AUTOMATIC DETECTION OF BUILD REGRESSIONS

RELATED APPLICATIONS

This application is a continuation of application Ser. No. 10/777,743, filed Feb. 12, 2004, status allowed.

The present application is related to co-pending and commonly assigned U.S. patent application Ser. No. 10/777,872, entitled "Method and Apparatus for Identifying Differences in Runs of a Computer Program Due to Code Changes" and filed on Feb. 12, 2004, U.S. patent application Ser. No. 10/777,742entitled "Method and Apparatus for Averaging Out Variations in Run-to-Run Path Data of a Computer Program" and filed on Feb. 12, 2004, and U.S. patent application Ser. No. 10/777,909 entitled "Method and Apparatus for Removal of Asynchronous Events in Complex Application Performance Analysis" and filed on Feb. 12, 2004, all of which are filed concurrently herewith and are hereby incorporated by reference.

BACKGROUND OF THE INVENTION

1. Technical Field

The present invention is generally directed to an improved computing system for tracing the execution of a computer program. More specifically, the present invention is directed to a method and apparatus for identifying differences in runs of a computer program due to changes in the code of the computer program.

2. Description of Related Art

When developing new software for use in complex computing environments, it is beneficial to conduct performance analysis on the software within the computing environments in which they are to be deployed to determine possible problems associated with the software or optimizations that may be performed on the software. This is the realm of the performance analyst. The performance analyst's job is straightforward: measure performance, find constraints to the level of performance achieved, eliminate or reduce their effects, and then start again; stop when measured performance achieves a previously agreed-to target. The challenges are enormous. Software performance can be degraded by many factors, e.g., by a particular hardware configuration, by the way the hardware is used by the software, by poor programming practices in the underlying operating system, by unexpected interactions between software modules, by inappropriate use of system resources by application or middleware software, and by poor programming or data-structuring technique in the application.

The analyst's objective is to isolate the primary cause and deal with it as quickly as possible. Even for small software applications this can be a difficult task. For highly complex environments this task can be quite daunting.

Many tools have been developed to assist analysts in dealing with these challenges. These tools include system and application profilers, e.g., AIX (Advanced Interactive Executive) tprof, gprof, Intel Corporation's VTune, application and system tracing facilities, e.g., AIX Trace, application and system memory use profilers, e.g., svmon, and system performance monitors, e.g., Windows NT Performance Monitor. Implementations of these and similar tools exist on many (though not all) platforms. Unfortunately, their implementations are not consistent, their output formats not readily comparable, and their models for computation and resource consumption not equivalent.

In order to provide a unifying approach for performance measurement, reporting, and analysis, International Business Machines, Inc. developed the arcflow technology which is described in "A Unifying Approach to Performance Analysis in the Java Environment", IBM Systems Journal, vol. 39, no. 1, 2000, authored by W. P. Alexander, R. F. Berry, F. E. Levine, and R. J. Urquhart. The arcflow technology provides a mechanism for unifying the recording and reporting components of performance analysis into a single data model and standard set of reports. Arcflow generates reports, i.e. xtrees, which are in the form of "call trees" that identify the parent child relationship between functions or methods as well as information about resource consumption of each function or method.

While arcflow provides an extremely useful analysis of trace data obtained from a trace of a computer program, the arcflow tool and the reports generated by the arcflow tool does not in itself provide information regarding differences between builds of a computer program. That is, there is no mechanism within arcflow to identify differences between the runs of two or more different builds of a computer program to ascertain differences in performance due to changes in the computer program. In addition, there is no mechanism within arcflow for averaging out asynchronous variations in the trace data of a plurality of executions of a computer program. Moreover, there is no mechanism within arcflow that allows for removal of asynchronous events either in the same or different builds of a computer program, so that analysis may focus on those areas of the computer program that consistently and appreciably affect the execution of the computer program.

Therefore, it would be beneficial to have an apparatus and method for identifying differences in runs of two or more different builds of a computer program based on call tree data structures generated based on trace data for the runs of these builds of the computer program. It would further be beneficial to have an apparatus and method for averaging out asynchronous variations in trace data of a plurality of executions of a computer program. Moreover, it would be beneficial to have an apparatus and method for removing asynchronous events in trace data for runs of a either the same or different builds of a computer program.

SUMMARY OF THE INVENTION

The present invention, in exemplary embodiments, improves upon the known arcflow tool by providing mechanisms that operate on trace information for multiple runs of the same or different builds of a computer program. In one exemplary embodiment, the present invention provides a mechanism for determining differences between runs of different builds of a computer program. With this embodiment of the present invention, call trees are generated for two or more builds of a computer program. The present invention involves performing a "tree-subtract" operation in which the two or more call trees generated during runs of two or more different builds of a computer program are subtracted from one another to identify build to build differences in the execution of the computer program.

As an example of this tree subtraction, two call trees generated based on traces of the execution of two different builds, A and B, of a computer program are considered. The process starts by generating a copy of the call tree for the first build A and adding a pass field which is set to 1 for each of the nodes of the call tree A. The call tree for the second build B is then walked over the copy of the call tree for the first build A. That is, at each step of walking the tree for the second build B, if a corresponding node exists in the copy of the call tree for the first build A, then the calls/base value for this node is set to the calls/base of the copy of the first call tree A minus the calls/base of the second call tree B. The pass field is then set to 3 to denote that both the first call tree A and the second call tree B contributed to the node.

If there is no corresponding node that exists in the first call tree A, then a node is created with a negative value of base and calls for the second call tree B. In this case, the pass field is set to 2 denoting that only the second call tree contributed to this node.

After walking the entire second tree and performing the subtraction in this manner above, a resulting tree data structure is obtained that retains all the call stack context from either of the first and second call tree. All of the base/call values in the resulting tree data structure are the difference between the two original trees. The pass value may be provided in the depiction of the resulting tree as well so that it is clear which call trees contributed to each node of the resulting tree.

From the resulting tree, portions of the runs of the different builds of the computer program where the resource utilization of the computer program has not changed are easily identifiable because the absolute value of the base at that node will be very small or zero. Moreover, portions of the runs of the different builds of the computer program where there are improvements or regressions in resource utilization of the computer program may be easily identifiable because the value of the base will be large, and positive for improvements or negative for regressions.

In addition to the above, a method and apparatus for averaging out variations from run to run of a computer program are provided. With the apparatus and method according to these embodiments, call trees are generated for two or more executions of a build of a computer program. The apparatus and method perform a "tree-addition" operation in which the two or more call trees generated during runs of the computer program are added to one another to thereby accumulate statistics for each call in the call trees. These statistics may then be divided by the number of runs whose tree data structures are being accumulated. In this way, an average of the tree data structures is generated. In addition, any portions of the tree data structure that are due to asynchronous events are averaged out so that their relative affect in the resulting tree data structure is minimized.

In other embodiments of the present invention, a method and apparatus for identifying a minimum call tree data structure from a plurality of call tree data structures are provided. With the apparatus and method of these embodiments, call tree data structures are generated for two or more executions of a build of a computer program. The apparatus and method perform a "tree-minimization" operation in which the two or more call trees generated during runs of the computer program are walked and only those nodes that are present in each of the tree data structures are maintained in a minimized tree data structure. In addition, the minimum values for these common nodes are maintained in the minimized tree data structure. In this way, asynchronous events are removed from the minimum tree data structure and analysis may focus on those areas of the computer program that are consistent between runs of the computer program.

In yet other embodiments of the present invention, a method and apparatus for automatically performing regression processing on trace data are provided. With the apparatus and method according to these embodiments, call tree data structures are generated for two or more executions of two or more builds of a computer program. The apparatus and method perform a "tree-minimization" operation on each set of call tree data structures for each of the builds to generate minimized call tree data structures for each build of the computer program. The minimized call tree data structures are then subtracted from one another to generate a subtracted minimized call tree data structure.

From this subtracted minimized call tree data structure, the portions of the computer program that are different from build to build and which appreciably and consistently affect the difference in execution of the computer program from build to build may be identified. Thus, the analyst's attention is directed to these areas of the computer program code which may be optimized in order to obtain better execution of the computer program.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary diagram of a distributed data processing system in which the present invention may be implemented;

FIG. 2 is an exemplary diagram of a server computing device in which aspects of the present invention may be implemented;

FIG. 4 is an exemplary diagram illustrating trace data that may be used as input to an arcflow tool;

FIG. 6 is an example of an xarc report generated by the arcflow tool using the input shown in FIG. 4;

FIG. 7 is an example of an xtree report data structure that is generated by the arcflow tool using the input shown in FIG. 4;

FIG. 8A is an example of trace data generated by a trace of a run of a first build of a computer program;

FIG. 8B is an example of trace data generated from a trace of a run of a second build of a computer program;

FIGS. 9A and 9B illustrate call tree data structures of FIGS. 8A and 8B in a graphical format;

FIGS. 10A and 10B illustrate the same call tree data structures in a textual format;

FIG. 11 illustrates a call tree data structure obtained by subtracting the call tree data structure of FIG. 9B from the call tree data structure of FIG. 9A;

FIG. 12 is an exemplary subtraction xtree report data structure generated by the present invention;

FIG. 13 is a flowchart outlining an exemplary operation of the present invention when generating a subtraction call tree data structure;

FIGS. 14A and 14B are exemplary diagrams of call tree data structures for describing addition of call tree data structures in accordance with one exemplary embodiment of the present invention;

FIG. 14C is an exemplary diagram of a call tree data structure resulting from the addition of the call tree data structures of FIGS. 14A and 14B;

DETAILED DESCRIPTION OF THE PREFERRED EMBODIMENT

Figure 3:
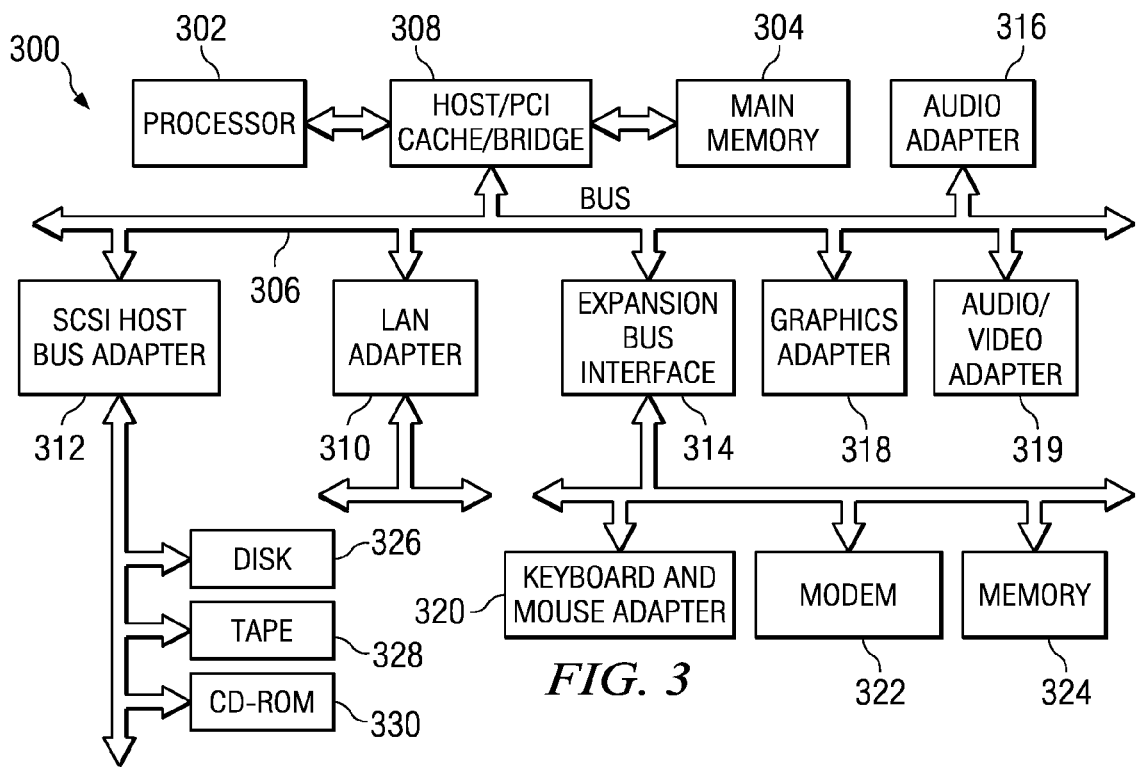
FIG. 3 is an exemplary diagram of a client or stand-alone computing device in which aspects of the present invention may be implemented.

The present invention provides a mechanism for identifying differences in runs of a computer program due to changes in the code of the computer program. As such, the present invention may be implemented in a stand alone computing device or a distributed data processing system. Therefore, the follow FIGS. 1-3 are provided as examples of such computing environments in which the present invention may be implemented. FIGS. 1-3 are only exemplary and are not intended to assert or imply any limitation on the environments in which the present invention may be used or deployed.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or Linux operating system.

With reference now to FIG. 3, a block diagram illustrating a data processing system is depicted in which the present invention may be implemented. Data processing system 300 is an example of a client computer or stand-alone computing device. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides a mechanism for identifying differences in the runs of a computer program that are due to a changes in the code of the computer program. The present invention involves performing a "tree-subtract" operation in which two call trees generated during runs of two different builds of a computer program are subtracted from one another to identify build to build differences in the execution of the computer program.

The present invention, in a preferred embodiment, is built upon the arcflow technology developed by International Business Machines, Inc. Therefore, a brief explanation of arcflow and some of the standard reports generated by arcflow will now be provided.

Arcflow attempts to provide information for indicating the relationships between resources and resource consumers, or simply "consumers." A "resource" is any computing resource that may be consumed by a resource consumer, e.g., processor cycles, memory, and the like. A "consumer" is a portion of code that makes use of, or consumes, a resource. For example, a method of a Java program may be a "consumer" of processor cycles and/or memory during execution of the computer program.

Arcflow provides the relationship information for identifying relationships between consumers and resources in order to help analysts determine answers to questions such as what resources are being consumed, where the resources are being consumed, why the resources are being consumed, and the like. In order to capture the key relationships between consumers and resources necessary to help analysts answer performance analysis "what," "where," and "why" questions, the following three definitions are provided.

Definition of consumer_context: A consumer_context is an abstraction of the state of a consumer at the point of resource consumption. This mapping reflects the state of the consumer at the time the consumption of the resource in question is recorded. A consumer_context is defined as a set of consumer identifiers and an optional time stamp:

$\{c_1, c_2, \ldots, c_n, t\}$ where $c_i$, $1 \leq i \leq n$, is the identifier (ID) of the ith consumer and t is the time stamp. There is an explicit hierarchy, i.e., $c_i$ is the parent of $c_{i+1}$. Each $c_i$ corresponds to a consumer, with $c_n$ being the consumer most immediately responsible for the resource consumption, $c_{n-1}$ is the consumer responsible for the actions of $c_n$, and so on. This hierarchy reflects the desired context in the level of detail appropriate for the analysis, e.g., one natural consumer_context hierarchy is a consumer calling sequence.

The rationale behind this definition is that resource consumption occurs in context. It is important to understand that context when exploring performance improvements. For example, a "call stack" A-B-C, reflecting that function A called function B which called function C, is a valid consumer_context. Any resources consumed by function C when function B and function A are on its invocation or call stack are considered distinct from resources consumed under a different invocation stack, even if consumed by (i.e., within) function C. A more detailed variant on the above might record the call stack in more detail, e.g., A:F0001330-B:F0002992-C:F0010122, where the hex addresses following the function name indicate the actual virtual address of the invocation (the value lies in discriminating between multiple call sites in a function). Another valid consumer_context would record both the call stack and time stamp at the time of the resource consumption.

Although the most common consumer_context reflects a function/method invocation hierarchy, it need not. Other variants include:

1) Object containment hierarchy (where each consumer ID, $c_i$, represents a unique object). The hierarchy reflects that object $c_i$ contains $c_{i+1}$.

2) Object allocation/creation hierarchy (where each $c_i$ again represents a unique object). The hierarchy reflects that object $c_i$ created $c_{i+1}$.

3) Module invocation hierarchy (where each $c_i$ indicates a module). This hierarchy is equivalent to the calling sequence hierarchy but with a different level of granularity for the consumer identifiers.

4) Basic block invocation hierarchy (where each $c_i$ indicates an instruction-level basic block). Again, this is an invocation hierarchy but, in this case, one that employs a finer granularity.

Definition of resource_consumption_list: A resource_consumption_list is a list of resources and an indication of the total amount of resources consumed. When coupled with a consumer_context, the combination represents the total amount of each resource consumed within a specific context. For example, <"object allocations" 100, "heap bytes allocated" 12450> is a resource_consumption_list indicating that a total of 100 object allocations have been made and that 12450 bytes have been allocated from the heap.

Definition of arcflow model: The arcflow model couples consumer_context data and resource_consumption_list data in order to provide a useful indication of resources used in some context. Thus, the general model of resource consumption consists of a set of triples and a descriptive vector:

AF0≡{(X, n, Y) such that
X is a consumer_context,
n is the number of times this
consumer_context has been encountered, and
Y is a resource_consumption_list} and
Z is a vector of descriptive bindings where Z provides:
1) A label describing the consumer identifiers ($c_i$) in X (e.g., "functions");
2) A label describing the units employed in the resource_consumption_list (e.g., "CPU_time," "instructions"); and
3) A label describing the meaning of n—the number of times a consumer_context is encountered (e.g., "calls," "entries").

Note that, depending on the granularity of the abstraction employed, this definition allows for the discrimination between executions of function A resulting from being called by function B and those resulting from being called by function C. Also note that if the consumer_context includes a time stamp, the model can record an explicit log of all events, in effect a trace of system behavior, with respect to all interesting consumer states and resources they have consumed.

It should further be noted that the model is unitless. This characteristic is a powerful abstraction that allows it to be employed in a broad range of analyses. Indeed, it is the key to the success of the model in unifying data recording and reporting. However, unitless reports are not very helpful, so Z is introduced to allow for the labeling of fields produced by the tools that implement the model and derivative reports.

Although the above is quite general, it has been found that a storage efficient and computationally efficient choice for the consumer_context is to eliminate the explicit time stamp. Similarly, it has been found that restricting the resource_consumption_list to a single resource (thus providing only a univariate view of resource consumption) is highly effective for focused analysis where the key resource of interest is known in advance. Therefore, for the remainder of this description, the term arcflow will refer to the restricted arcflow model:

AF1≡{(X, n, Y) such that
X is a consumer_context having no time stamp, n is the number of times this consumer_context has been encountered;
Y is a resource_consumption list consisting of a single resource}; and
Z, a vector of descriptive bindings.

The model described in the foregoing, AF1, forms the basis for a powerful set of standard performance reports. It is these reports that analysts use to answer the "what", "where" and "why" questions above.

FIG. 4 is an exemplary diagram illustrating trace data that may be used as input to an arcflow tool. The trace data shown in FIG. 4 may be raw trace data of a computer program execution collected using a trace application. The raw trace data identifies resource acquisition and release events during the execution of an exemplary computer program, i.e. AC_test.

Two types of records exist in the depicted example. The first record in the example indicates a process/thread switch. In this case, the first record of the depicted example indicates that all subsequent records (up to the next process/thread switch) reflect activity performed by the process/thread: AC_test. The name is only illustrative. In general, process/thread identifiers have a different appearance from that shown in FIG. 4.

The next type of record indicates either the start of a resource use (denoted by ">") or the end of a resource use (denoted by "<"). The name of the consumer is also indicated (in this case, the name of a method in the Java program). In the depicted example, the names of the consumers are simply alphanumeric characters for simplicity, however in real-world use, the names of the consumers may be more complex strings of characters.

Each record is marked with a resource consumption level. The resources are those whose consumption is measured (e.g., system CPU time, wall clock time, instructions executed, and the like). In the depicted example, the metric is CPU time in seconds, and each trace record begins with a CPU time stamp.

As a result, the trace data in FIG. 4 may be read as 0 seconds of CPU time are used and then method A is entered. Thereafter, 1 second of CPU time is used and method B is entered. One more second of CPU time is used and method B exits and control returns to method A. From this information, it can be determined that up to this point in the trace, Main has used no CPU time, method A has used 1 second of CPU time and called method B, and that method B has used one second of CPU time, and so on.

When input into the arcflow tool, the resulting arcflow model representation for the performance data in FIG. 4 is shown in Table 1 below:

TABLE 1

Arcflow model data for AC_test

| X consumer_context "Method names" | n number of occurrences "Number of calls" | Y resource_consumption "cpu-seconds" |
|---|---|---|
| Main | 1 | 0 |
| Main A | 1 | 1 |
| Main A B | 2 | 2 |
| Main A B C | 1 | 1 |
| Main B | 1 | 1 |
| Main B A | 1 | 1 |
| Main B A C | 1 | 1 |
| Main B A X | 1 | 0 |
| Main B A X E | 1 | 1 |
| Main B A X F | 1 | 1 |
| Main B A X G | 1 | 1 |

In the above table, the differences in the time stamps of successive trace records have been used to compute the total resource_consumption for each consumer_context, and the time stamps themselves are no longer needed. The explicit representation of the consumer_context, in this case the call-stack, provides the additional information required to gain insight into the "where" and "why" analysis questions. In particular, the context provides more information about application structure and explicitly surfaces leverage points for performance improvement.

There is significant redundancy in the model shown in Table 1. In particular, many of the consumer context entries share common prefixes (e.g., "Main B A"). Fortunately, the structure and semantics of the consumer context allow for very efficient storage of the arcflow model. The consumer context represents a hierarchy, with each consumer identifier in a superior position to its immediate successor. This hierarchy has many possible interpretations with the specific interpretation depending on the particular bindings associated with a specific application of the model (i.e., a specific set of data collected and recorded in the model).

The most common interpretation is that of a callstack, e.g., for consumer context $\{c_1\ c_2\ c_3\}$, the interpretation is that $c_1$ called $c_2$ and $c_2$ then called $c_3$. Another interpretation is containment, e.g., object $c_1$ contains $c_2$ and $c_2$ contains $c_3$.

A tree structure is used for recording the arcflow model. This tree structure (which is referred to as the "call tree", in deference to the most frequent use of this methodology) consists of a set of nodes, with each node containing the following information:

```
{
  parent consumer ID,
  consumer ID,
  number of occurrences,
  total resource consumption,
  list of children consumer IDs
}
```

Figure 5:
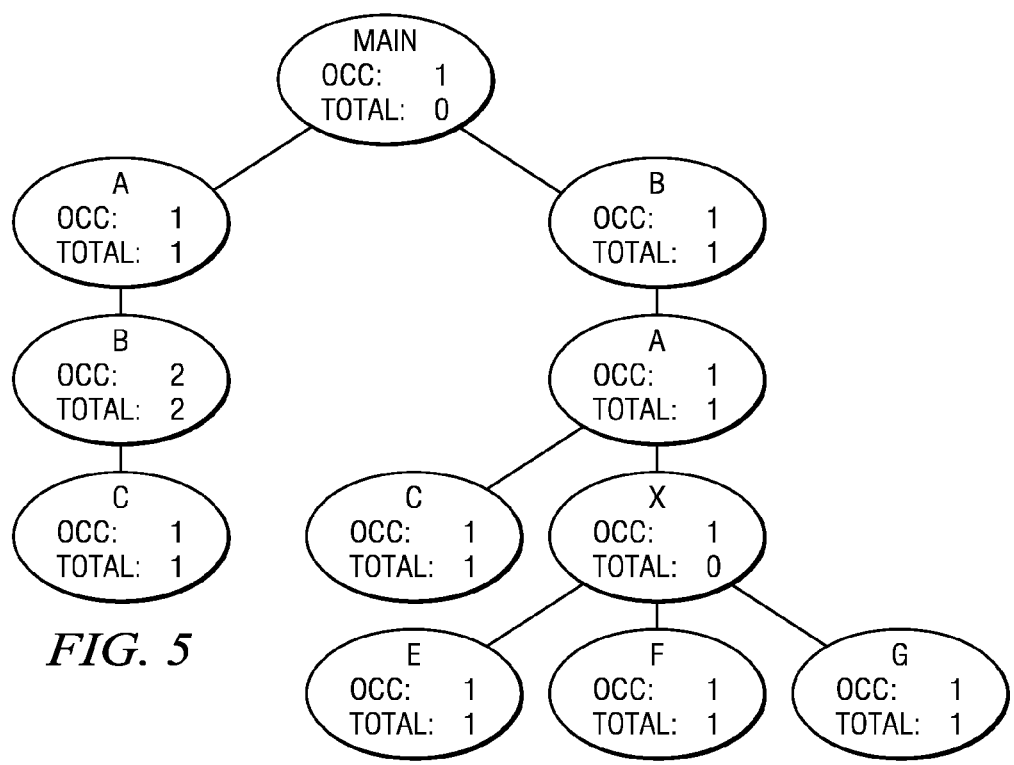
FIG. 5 is an exemplary diagram of a call tree for the exemplary input shown in FIG. 4.

There is a single root node having no parent. This approach reduces the storage costs of the model to being roughly proportional to the total number of unique contexts in which consumer IDs are encountered in the measured data. In the case of the present example, there are 11 such unique contexts. Thus, the call-tree contains 11 nodes. The call tree for the above example is shown graphically in FIG. 5. Each node is shown with the consumer ID, number of occurrences, and total resource consumption. The parents and children are indicated graphically. In fact, there is one more node corresponding to the process/thread consumer under which the methods Main, A, B, C, X, E, F, and G consumed the CPU resource. This node has been left out of Table 1 and FIG. 5 as a simplification.

The storage cost reduction in employing this call tree technique is very significant. The reduction has broader implications than simply saving space and speeding data analysis. Since many applications typically reach steady state behavior with respect to program flow (that is, after a relatively short number of entry-exit events, most common callstacks and consumer contexts are realized as elements in a call tree), it becomes feasible to consider building the call tree live, as resource consumption events are recorded. In this way, the need to write the events at all is obviated, saving both storage and a significant number of processor cycles.

The arcflow tool generates several standard reports that provide information about the trace of the computer program. One such report, and the report from which the arcflow tool obtains its name, is the xarc report. An example of an xarc report is illustrated in FIG. 6.

Analysts are interested in the consumption of resources, but they are generally more interested in why they are consumed. The xarc report helps to answer these questions. This report, although textual in format, is actually a graphical rendition of application structure. Individual consumers (e.g., methods in the running example) are presented along with their resource (e.g., CPU time) usage. The context for the consumption is made explicit by linking the consumer with its parents (e.g., its callers) and its children (e.g., the methods it calls). In this way it is possible to discern the magnitude of the resource usage of one method, the drivers of that use, and the implications of changing the behavior of this method.

The xarc report is organized in paragraphs, or stanzas. Stanzas are separated by dashed (==) lines. Each stanza includes a record for "self," a set of "parent" records, and a set of "child" records. Every unique consumer is represented by a stanza in which the self record identifies that consumer by name in the "function" column. Three key types of metrics are reported for each consumer: "calls," "base," and "cum" (short for cumulative). "Calls" indicates the number of times that a consumption event (e.g., a function call) has been recorded on behalf of this consumer. "Base" and "cum" both pertain to the quantity of resource consumed. "Base" indicates the amount consumed directly by this consumer in the context defined by its set of parents. "Cum" indicates the amount consumed both by the consumer directly and all of its descendants (its children, their children, and so on recursively.) The depicted examples in FIG. 6 illustrate a variant of the arcflow reports that normalize the resource consumption to percentages rather than show the absolute counts.

Each stanza focuses an analyst's attention on resource consumption from the perspective of a single consumer (the one named in the self record for that stanza). This consumer is referred to in the following discussion as the self-consumer. Within each stanza, the interpretation of base and cum depends on which records are being considered. For the self record, base and cum apply directly to all resource consumption associated with that function, irrespective of context. For the parent records, the base value reports resources consumed by the self-consumer in the context of (e.g., as a result of) the indicated parent. For the parent records, the cum value indicates the resources consumed directly by the self-consumer and any of its descendants in the context of the indicated parent.

These relationships are formalized in a set of invariants. Understanding these invariants is important to navigating the report:

Sum(parent(calls))=self(calls): The total number of calls recorded for the self-consumer are broken out by which parent made the calls;

Sum(parent(base))=self(base): The total resource directly consumed by the self-consumer can be decomposed into resource consumed on behalf of each of the parents of the self-consumer;

Sum(parent(cum))=self(cum): The total resource consumed by the self-consumer (which includes all of its descendant's consumption) can be decomposed into total resources consumed on behalf of each of the parents of the self-consumer; and Sum(child(cum))=self(cum)−self(base): The resources consumed by the self-consumer can be decomposed into those directly consumed by the self-consumer and those consumed by its children and their descendants.

As an illustration, FIG. 6 shows the complete set of xarc report stanzas for the running example discussed above. In the stanza for method main, main is shown as having one parent, named AC_test_pidtid. This is because all methods are executed on some thread of control. The instrumentation in the depicted implementation associates activity with the thread that executes it. In effect, the thread becomes the highest-level consumer or driver of work.

Main is responsible for 100 percent of CPU time consumed although none of that is within the body of method main, i.e. the children, B and A, are wholly responsible. The children of main are shown as B and A. B is responsible for 60 percent of the total CPU time consumption, whereas A is shown as being responsible for 40 percent.

A benefit of the xarc report is in reflecting the performance impacts of concepts such as reuse. The analyst can immediately see the relationships between key methods and thus can immediately begin to pose more interesting questions, such as, "What if X were eliminated or improved substantially?"

Another example of the reports generated by the arcflow tool is the xtree report. An example of the xtree report data structure is shown in FIG. 7. The xtree report data structure most closely reflects the contents of the underlying arcflow model of the trace of the computer program. Indeed, it is produced by navigating the call tree directly. The value of the xtree report lies in the completeness of its depiction of application structure coupled with measured performance data. The xtree report data structure communicates more information about program structure than the xarc report, e.g., discriminating between all unique calling sequences, whereas xarc will aggregate across calling sequences from the perspective of a single method.

For example, consider the xarc stanza for method A and compare it with the xtree information reported below that includes A in the calling sequences. The xarc report is unable to discriminate between execution paths through A, e.g., A is called by main; A calls B, C, and X. But do all calls from main to A result in a call to C? Indeed no. The xtree report retains that level of structure.

For example, in FIG. 7 it is shown that method A calls method B, which then calls method C only one time. The other call from method A to method B does not result in subsequent calls to method C or to any other (instrumented) method.

The present invention uses the xtree information obtained from the xtree reports generated by the arcflow tool to obtain information regarding the manner by which runs of different builds of a computer program differ or remain the same. In one exemplary embodiment of the present invention, xtree reports are generated for different builds of a computer program and are subtracted from one another to obtain information regarding what elements of the runs of these two builds are different. In another exemplary embodiment of the present invention, a minimum function is performed using two or more xtree reports of the runs of the same or different builds of a computer program to remove asynchronous or random events from the xtree reports (hereafter simply referred to as the "xtrees". In yet another exemplary embodiment of the present invention the "xtrees" of two or more runs of the same or different builds of a computer program are added in order to average out variations from run to run. In still another embodiment of the present invention, a performance regression process is performed on two or more xtrees of the same or different builds of a computer program to identify path changes in key workload flows. Each of these embodiments will be described hereafter.

Xtree Subtraction

In the life of a developing software product, the software may undergo many changes daily to the code in an attempt to improve the code for a specific purpose. In such a situation, the performance analyst is expected to be able to quickly identify performance changes, either improvements or regressions due to the changes in the code. While some tools exist for flagging regressions in performance, none of these tools provide a context for identifying the cause of this regression. The present invention provides a method for identifying performance and workload flow changes caused by code changes. With the present invention, code path additions, deletions, and modifications between builds may be identified.

In one exemplary embodiment, the present invention provides a method and apparatus for identifying differences in runs of a computer program that are due to changes in the code of the computer program. With the present invention, call trees are generated for two or more builds of a computer program. The present invention involves performing a "tree-subtract" operation in which the two or more call trees generated during runs of two or more different builds of a computer program are subtracted from one another to identify build to build differences in the execution of the computer program.

As an example of the manner by which the runs of two different builds of a computer program are subtracted to identify differences between the execution of the builds of the computer program, consider the two sets of trace data shown in FIGS. 8A and 8B. The set of trace data shown in FIG. 8A represents a run of a first build of the computer program, i.e. build A, and the set of trace data shown in FIG. 8B represents a run of the second build of the computer program, i.e. build B. These two sets of trace data are obtained from a trace tool, such as jprof, developed by International Business Machines, Inc. The two sets of trace data use the same format as previously described above with regard to FIG. 4, except the numbers in FIGS. 8A and 8B represent actual resource consumption. These sets of trace data are used as input to the modified arcflow tool of the present invention in order to obtain a subtracted tree data structure, which is also an xtree, identifying the differences in the runs of the two builds of the computer program.

Having obtained two sets of trace data from a trace tool, the present invention inputs this trace data into a modified arcflow tool that generates a call tree for each of the sets of trace data. FIGS. 9A and 9B show the call tree data structures in a graphical format, which correspond to the input data of FIGS. 8A and 8B, respectively. FIGS. 10A and 10B show the same call tree data structures in textual format, similar to that in FIG. 7 except that two columns have been added showing the actual base and cum resource consumption in addition to percentages. Thus, for example, the value "3" in the base field 1010 for the entry corresponding to method A indicates that 3 CPU cycles were spent executing instructions that are within method A. The value "22" in the cum field 1020 for the entry corresponding to method A indicates that 22 CPU cycles were spent executing instructions in method A or A's descendants, e.g., methods B, C and D.

These call trees are then used to perform the subtraction according to the present invention. The process starts by generating a copy of the call tree for the first build A, i.e. the call tree in FIG. 9A, and adding a pass field which is set to 1 for each of the nodes of the call tree A. Since this copy of the call tree data structure is essentially the same as that shown in FIG. 9A with the addition of the pass field value, for simplicity, the following description will make reference to FIG. 9A.

The call tree (FIG. 9B) for the second build of the computer program, i.e. build B, is then walked over the copy of the call tree for the first build A (FIG. 9A). That is, at each step of walking the tree for the second build B in FIG. 9B, if a corresponding node exists in the copy of the call tree for the first build A in FIG. 9A, then the calls/base value for this node is set to the calls/base of the copy of the first call tree A in FIG. 9A, minus the calls/base of the second call tree B in FIG. 9B. The pass field is then set to 3 to denote that both the first call tree A and the second call tree B contributed to the node.

If there is no corresponding node that exists in the first call tree A (FIG. 9A), then a node is created with a negative value of base and calls for the second call tree B (FIG. 9B). In this case, the pass field is set to 2 denoting that only the second call tree (FIG. 9B) contributed to this node. Thus, from the pass field values, it can be determined whether only the first call tree, only the second call tree, or both call trees contributed to a corresponding node or entry in a subtracted call tree data structure.

After walking the entire second tree (FIG. 9B) and performing the subtraction in this manner above, a resulting tree data structure is obtained that retains all the call stack context from either of the first and second call tree. This resulting tree data structure is shown in FIG. 11. All of the Call, Base and Cum values in the resulting tree data structure in FIG. 11 are the difference between the two original trees, i.e. FIGS. 9A and 9B. The pass value is provided in the depiction of the resulting tree as well so that it is clear which call trees contributed to each node of the resulting tree.

In the extremely simple example represented by FIGS. 9A and 9B, it is obvious that the improved performance of this program is entirely due to the substitution of method E, taking only 6 CPU seconds, for method D which took 7 CPU seconds. But real software systems may consist of millions of lines of code, thousands of different methods or routines, each of which may be called in dozens of callstack contexts, resulting in xtrees with tens of thousands of nodes. Furthermore, from one build to the next there may be hundreds of code changes, most of which have no discernable impact on performance. In such a real-world situation, finding which changes are responsible for a measured performance change can be extremely difficult. The value of the present invention is that it highlights exactly the code changes most responsible for changes in performance.

The "CumA" field 1130 in FIG. 11 is the sum of the absolute values of all the changes in the traced metric associated with a method and its descendants. This value is important for identifying areas of code in which substantial performance changes have occurred, but which mostly cancelled each other out, resulting in only a small net change. In the present example, at the top level in method A, build B was only one CPU second faster than build A, as reflected in the value of "1" in the column labeled "Cum", but underneath there was considerable "churn", with a deletion of seven seconds and an addition of six; the large value of 13 in the column labeled "CumA" calls the analyst's attention to this fact.

FIG. 12 is a subtraction xtree report (or subtraction xtree) generated by performing the tree subtraction operation previously described. This subtraction xtree is obtained by subtracting the values associated with the base field 1010 and the number or calls field 1040 of the xtree for the second build, i.e. FIG. 10B from the values for these fields for the first build, i.e. FIG. 10A. Thus, for example, in the subtraction xtree of FIG. 12, method A has a base of 0 (i.e. 3−3=0), and a number of calls of 0 (i.e. 1−=0). Method B is not listed since both the base value for Method B and the cum value for method B, discussed hereafter, becomes zero after subtraction (i.e. 7−7=0). Method C has a base value of 0 after subtraction (i.e. 5−5=0) and a number of calls of 0 (i.e., 1−=0), method D has a base value of 7 (i.e. 7−0=7) and a number of calls of 1 (i.e., 1−0=1), and method E has a base value of −6 (i.e. 0−6=−6) and a number of calls of −1 (i.e. 0−1=−1).

The cum field 1120 and CumA field 1130 values are then calculated based on the new subtracted values for the base field. As a result, method A's cum value is 1 and absolute cumulative value is 13 representing 7 CPU cycles used in method D and 6 CPU cycles used in method E.

In the subtraction xtree shown in FIG. 12, methods whose paths have not changed between builds have zero path values or are not present in the subtraction xtree. Thus, for example, method B is not present in the subtraction xtree because the path of method B, i.e. the base number of metrics associated with method B and the cumulative number of metrics associated with method B and any methods called by method B, is the same between builds. Methods A and C have base values that are 0, meaning that there is no change in the runs of the builds with respect to the number of metrics utilized only by methods A and C. However, methods A and C have cumulative values of 1 meaning that the methods called by A and C have resulted in an increase in resource usage of 1 metric unit between builds.

Method D has a base value and a cumulative value of 7 meaning that the method D increases the resource usage by 7 between builds and that this increase is due to the execution of instructions within method D. The positive numbers for base and cumulative values indicates that the larger amount of resource usage with regard to method D is with regard to the first build of the computer program. Similarly, method E has a base and cumulative value of −6 indicating that the method F increases the resource usage by 6 between builds and that this increase is due to the execution of instructions within method E. Furthermore, the negative base and cumulative values indicates that the larger amount of resource usage with regard to method E is with regard to the second build of the computer program.

The positive base and cumulative values also indicate where there have been improvements due to build-to-build changes in the code. A positive base and cumulative value indicates, at least with respect to resource usage, an improvement in the code since the second build requires less resource usage than the first build. A negative value indicates an increase in resource usage (a "regression" in performance terminology) in the second build of the computer program due to the method associated with the negative value.

In addition to the base and cum fields of the subtraction xtree, the CumA field provides information identifying the location of the changes in resource usage within the execution paths of the computer program. For example, the CumA value of method A is 13, yet the cumulative value of method A is 1. Thus, the change in resource usage may be clearly identified as being associated with methods called by method A or their descendants, i.e. methods C, D and E. Similarly, method C has a cumulative value of 1 and a CumA value of 13, which indicates that the resource usage is associated with methods called by method C. Since methods D and E have the same absolute cum and CumA values, the resource usage indicated here is attributable to methods D and E directly.

A number of flowcharts will be described hereafter, which illustrate various operations of embodiments of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 13, the operation starts by receiving trace data from a trace of the execution of two or more different builds of a computer program (step 1310). Thereafter, the trace data is input to an arcflow tool to obtain a call tree data structure for each execution of the two different builds (step 1320). The call tree data structure for the execution of one of the builds of the computer program is then subtracted from the call tree data structure for the other execution of the other build of the computer program (step 1330). The resulting call tree data structure is then used to generate a subtraction xtree data structure (step 1340) which is then output for use by an analyst in identifying the differences in execution of the computer program that are due to changes in the code of the computer program between builds (step 1350). This process may be repeated for each pair of trace data sets that need to be compared to identify differences in the execution of the builds that are due to code changes.

Thus, from the subtraction xtree generated using the present invention, the changes in resource utilization of the paths of execution of the different builds of the computer program may be determined. That is, the improvements/regressions that have occurred from going from one build to another may be clearly identified in the subtraction xtree. Furthermore, the context or locations of these improvements/regressions may be pinpointed using the subtraction xtree.

Xtree Addition

The above embodiments of the present invention provide a mechanism for determining changes in execution of a computer program that are due to changes in the code of a computer program from one build to the next. In addition to being able to identify differences in executions of builds of a computer program that are due to changes in the code, the present invention provides a mechanism for averaging out variations from run to run of a computer program.

As discussed previously, it is part of a performance analyst's job to measure and explain changes in performance from one build or version of a program to another. But the very same build of a program may not exhibit exactly the same performance from run to run. Performance variation can be caused by external factors, such as variations in network traffic, or internal factors, such as variation in disk access time. If the normal performance variation of a given program is of a magnitude greater than or equal to the difference in performance between two builds, the exact difference between the two builds may be impossible to determine. In such cases, it is useful to run each build multiple times and calculate the average performance of each build. By comparing the two averages, one can conclude that, on average, build A is faster/slower than build B. In such a case, in order to be able to apply the arcflow methodology to determine the cause of this performance difference, an xtree is needed that represents the average of multiple xtrees.

Another situation in which the average of multiple xtrees is useful is in amortizing the effect of anomalies on perceived performance. For example, it may happen that during the execution of a program, the operating system must suspend execution of the program to handle an interrupt and then resume execution of the program. If this occurs, for example, while the program was executing method D, the apparent path length of method D will be much longer than it actually is. This in turn can lead a performance analyst to draw incorrect conclusions about a performance improvement or regression. However, if one takes trace data of multiple runs of a given build, creates xtrees from each trace, and constructs an xtree of their average, the apparent effect of such anomalies is much smaller. This allows the analyst to focus on performance changes that are truly the effect of changes in program implementation.

The present invention provides a mechanism for adding two or more call tree data structures to obtain a new call tree data structure that represents the addition of these two or more call tree data structures. By adding the two or more call tree data structures, run to run anomalies that are not inherent in the structure of the program may be amortized. The call tree data structure that results from this addition of the two or more call tree data structures for different runs of the computer program automatically amortizes random events which may or may not occur in different places in each run, and which may or may not have different costs associated with them.

As with the xtree subtraction discussed above, the xtree addition and averaging mechanism of the present invention starts by receiving trace data from traces of executions of the computer program. This trace data is input to an arcflow tool to generate xtree data structures for the trace data sets that are input.

Xtree data structures are then added by taking a first xtree data structure and walking the xtree data structure. As the first xtree data structure is walked, the call and base values are set in accordance with the trace data and the xtree data structure. The second xtree data structure is walked over the first xtree data structure in a similar manner as discussed above with regard to the xtree subtraction mechanism of the present invention. However, whenever a new node is encountered in the second xtree data structure that is not in the first xtree data structure, a new node of the resulting call tree is generated to represent this new node. If a matching node is found in both the first and second xtree data structures, the call values and the base values are added. This process continues until the entire second xtree data structure is walked over the entire first xtree data structure.

This process may be repeated for each additional xtree data structure that is to be added. In subsequent additions, the result of the first and second xtree data structures may be considered a first xtree data structure in the subsequent addition. In this way, the resulting xtree data structure is a sum of each of the individual xtree data structures for the various runs of the computer program as obtained from the trace data compiled during the runs of the computer program.

Referring to FIGS. 14A and 14B, assume that FIG. 14A represents the call tree data structure associated with a first run of a computer program and FIG. 14B represents the call tree data structure associated with a second run of the computer program. In such a situation, the change in values for method D may represent variations or anomalies that may occur during runs of the computer program. For example, the increase in base and cum for method D may be due to an interrupt being processed that causes additional CPU time to be attributed to method D.

FIG. 14C is an exemplary diagram of a resulting call tree data structure obtained from the addition of the call tree data structures of FIG. 14A and FIG. 14B. In actuality, FIG. 14C is the addition of one run that results in the call tree data structure of FIG. 14A, and three runs that each result in the call tree data structure of FIG. 14B. As shown in FIG. 14C, the resulting call tree data structure differs from the call tree data structure obtained through subtraction of xtrees as depicted in FIG. 10 in that node B is not eliminated and the base and cumulative values are the sum of the base and cumulative values for corresponding nodes. Furthermore, it can be seen from FIG. 14C that the anomaly of 10 CPU seconds being attributed to method D can be averaged out by dividing the values for the methods by the number of sets of trace data that are being added together. Thus, dividing the values for method D by 4, the result is 7. This average value would continue to approach 6 as more runs of the computer program are traced and added. In this way, the affect of anomalies on the resulting call tree data structure may be averaged out.

Figures 15, 16:
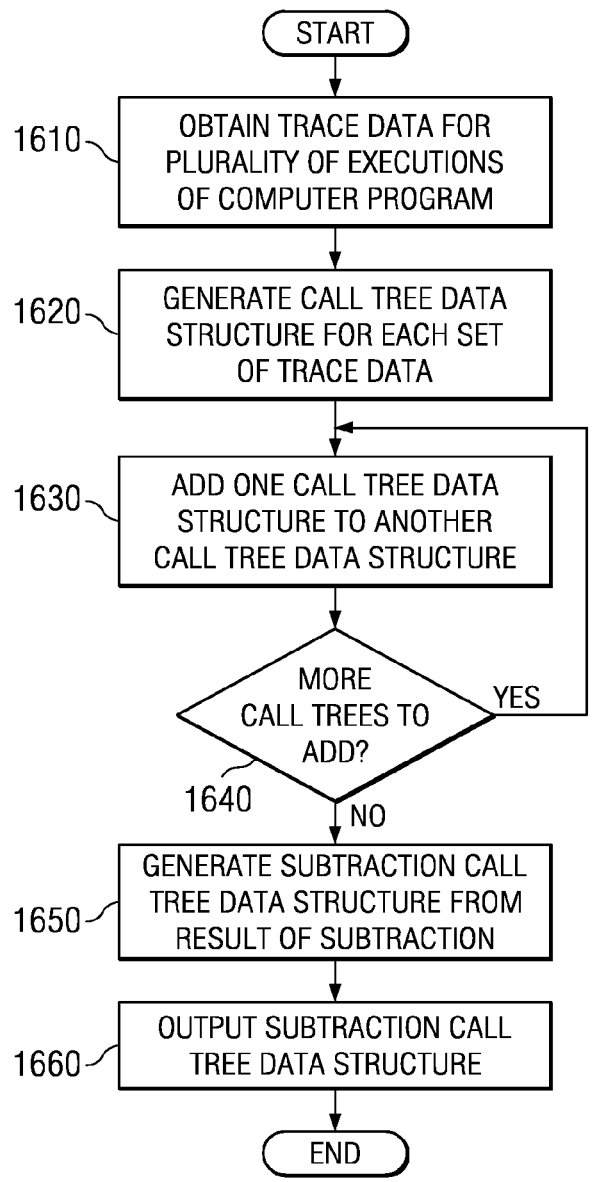
FIG. 15 is an exemplary xtree data structure corresponding to the call tree data structure of FIG. 11.
FIG. 16 is a flowchart outlining an exemplary operation of the present invention when adding call tree data structures for a plurality of runs of a computer program and averaging out variations from run to run.

FIG. 15 is an exemplary xtree data structure corresponding to, and obtained from, the call tree data structure of FIG. 11. As shown in FIG. 15, the number of calls and the base values for the methods in the call tree data structure are equal to the addition of the call and base values of the nodes of each individual call tree data structure. The cumulative value and the absolute cumulative values are calculated based on the base values for each of the methods (base) and the methods that they call (cumulative).

The average of these call, base, cumulative, and absolute cumulative values may be obtained by dividing these values by the number of call tree data structures or xtree data structures that are added together. Thus, for example, the average call, base, cumulative and absolute cumulative values for the example illustrated in FIG. 15 may be obtained by dividing each of these values by 2, i.e. the number of call tree data structures that were added. As a result, the average base value for methods A-E would be 3, 7, 5, 3.5 and 3, respectively. The average cumulative values would be 21.5, 7, 11.5, 3.5 and 3. It can be seen from this example that, as the number of runs that are added are increased, the resource usage cost associated with variations, such as methods D and E, will be averaged out, i.e. the average values become smaller and smaller, while the values for the core methods of the executions of the computer program maintain a relatively higher resource usage.

FIG. 16 is a flowchart outlining an exemplary operation of the present invention when adding call tree data structures for a plurality of runs of a computer program and averaging out variations from run to run. As with FIG. 13 above, it will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 16, the operation starts by receiving trace data from a trace of the execution of two or more runs of a computer program (step 1610). Thereafter, the trace data is input to an arcflow tool to obtain a call tree data structure for each execution of the computer program (step 1620). The call tree data structure for the execution of one of the runs of the computer program is then added to the call tree data structure for the other execution of another run of the computer program (step 1630).

A determination is made as to whether there are any more call tree data structures to added (step 1640). If so, the operation returns to step 1630 and adds the next call tree data structure to the previously obtained sum of the call tree data structures. If there are no more call tree data structures to add, the resulting call tree data structure is then used to generate an addition xtree (or xtree) data structure (step 1650). The call, base, cumulative and absolute cumulative values may then be averaged based on the number of call tree data structures added (step 1660). The resulting call tree data structure with the averaged values may then be output for use by an analyst in identifying the costs associated with variations occurring within multiple executions of a computer program (step 1670). The operation then terminates.

In this way, variations in context for multiple runs of the same application may be averaged out. Moreover, run to run anomalies that are not inherent in the structure of the program are amortized. Thus, the resulting call tree data structure obtained through the use of this invention automatically amortizes random events which may or may not occur in different places in each run, and which may or may not have different resource usage costs associated with them.

Xtree Minimization

In addition to the above, the present invention provides a mechanism for determining a minimum tree data structure for various runs of the same build of a computer program. While the above xtree subtraction mechanism of the present invention is utilized to determine changes in runs that are due to changes in the code of a computer program between builds, the minimization mechanism of the present invention determines the minimum xtree data structure that is consistent from run to run. In this way, noise, e.g. asynchronous events like paging, interrupts, memory allocation variances, and the like, may be eliminated from the minimized tree. By eliminating this "noise", the minimized xtree of the present invention helps to identify the core part of the trace of the computer program that an analyst should focus on when determining how to optimize the execution of the computer program rather than wasting time on portions of the computer program that do not appreciably affect the running of the computer program.

In this embodiment of the present invention, a minimum xtree is generated based on two or more xtree data structures. The minimum xtree is generated by walking the xtree data structures and only including in the minimum tree those nodes that are present in each of the xtree data structures being walked.

For example, assume that three xtree data structures are generated based on trace data from three different runs of the same build of a computer program. These three xtree data structures are labeled A, B and C. Xtree data structure B is walked over xtree data structure A to determine the nodes of the xtree data structures that are consistent between runs. The xtree data structure C is then walked over the xtree data structure resulting from the comparison of xtree data structure A and xtree data structure B.

With each comparison, the lowest values associated with the common nodes are maintained in the resulting minimized xtree data structure. The result of these operations is a minimized xtree data structure in which the "noise" generated by asynchronous events is removed.

Figure 17A:
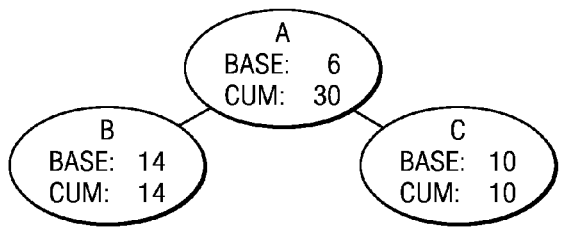
FIGS. 17A-C are exemplary diagrams of graphical representations of xtree data structures that may be generated based on trace data obtained from runs of the same build of a computer program.
Figure 17B:
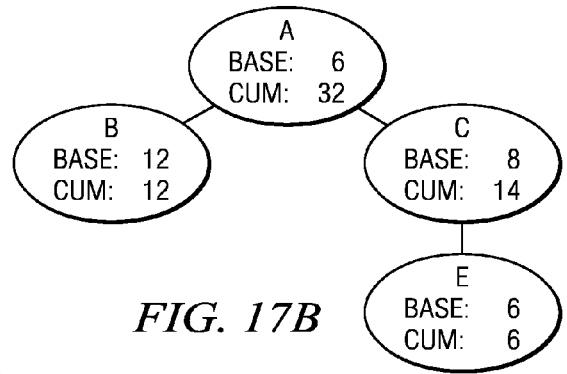
Figure 17C:
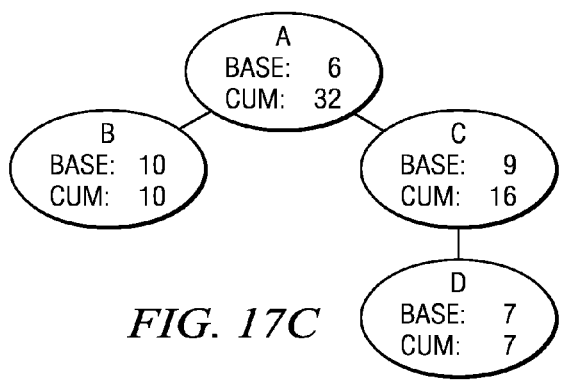
Figure 18A:
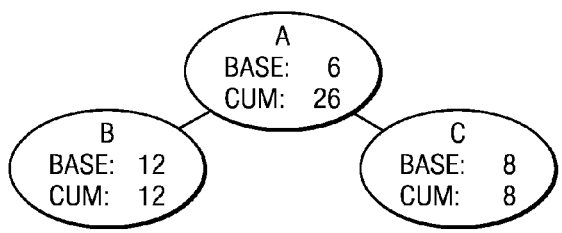
FIG. 18A is an exemplary diagram of a graphical representation of the minimum xtree data structure generated by walking of the xtree data structure of FIG. 17B over the xtree data structure of FIG. 17A.

FIGS. 17A-C are exemplary diagrams of graphical representations of xtree data structures that may be generated based on trace data obtained from runs of the same build of a computer program. FIG. 18A is an exemplary diagram of a graphical representation of the minimum xtree data structure generated by a walking of the xtree data structure in FIG. 17B over the xtree data structure in FIG. 17A. As shown in FIG. 18A, the common nodes between these xtree data structures are nodes A, B and C with minimum base values of 6, 12 and 8, respectively, being maintained. The cumulative values are generated from these minimum maintained base values.

Figure 18B:
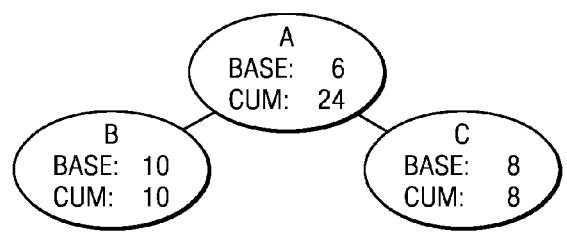
FIG. 18B is an xtree data structure obtained by walking the xtree data structure of FIG. 17C over the minimum xtree data structure of FIG. 18A.

FIG. 18B is an xtree data structure obtained by walking the xtree data structure in FIG. 17C over the minimum xtree data structure shown in FIG. 18A. As shown in FIG. 18B, the common nodes between the minimum xtree data structure in FIG. 18A and those in the xtree data structure of FIG. 17C are nodes A, B and C with minimum base values of 6, 10 and 8, respectively, being maintained. Thus, the result of these operations is a minimum xtree data structure in which only the common nodes between the three original xtree data structures are maintained with minimum values.

This minimum xtree data structure eliminates the noise that is present in the original xtree data structures, e.g., asynchronous events. As a result, only those portions of code that are present in each of the runs of the computer program are present in the minimum xtree data structure. Thus, only those portions of code that are most likely to affect each run of the computer program are considered when an analyst analyzes the minimum xtree data structure. From this minimum xtree data structure, the analyst may determine which portions of code could be optimized to affect all runs of the computer program.

Figure 19:
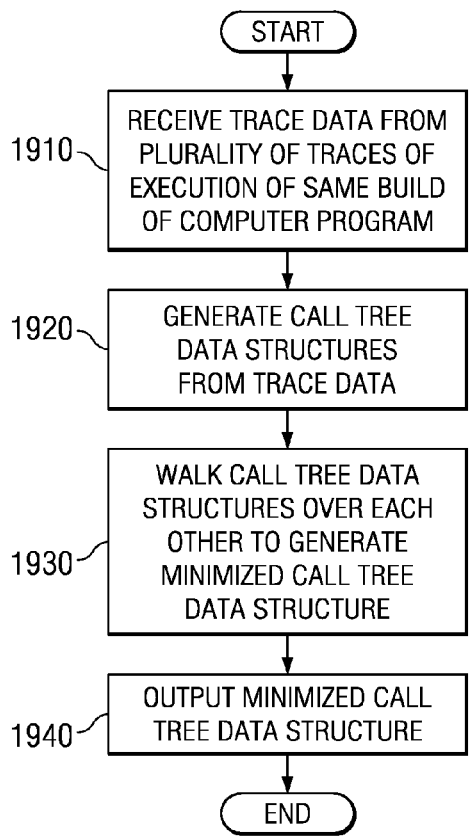
FIG. 19 is a flowchart outlining an exemplary operation of the present invention when generating a minimized xtree data structure.

FIG. 19 is a flowchart outlining an exemplary operation of the present invention when generating a minimized xtree data structure. As shown in FIG. 19, the operation starts by receiving trace data from a plurality of traces of the execution of the same build of a computer program (step 1910). Thereafter, the trace data is input to an arcflow tool to obtain call tree data structures, e.g., xtree data structures, for each execution of the computer program (step 1920). The call tree data structures are then walked over each other in order to generate a minimized call tree data structure that includes only those nodes that are common to each call tree data structure (step 1930). The resulting minimized call tree data structure is then output for use by an analyst in identifying portions of the computer program that may be optimized to affect every run of the computer program (step 1940). The operation then terminates.

Xtree Automatic Performance Regression

The above embodiments of minimization of xtree data structures and xtree data structure subtraction may be combined in order to identify performance regressions between builds. Since the code of a developing product may change daily and may be the result of a merge of a large number of code changes, it is important to automatically ascertain which of these changes actually result in a difference in the execution of the computer program rather than merely causing asynchronous anomalies in the running of the computer program.

In this further embodiment of the present invention, multiple traces of a build of a computer program are obtained in order to generate xtree data structures based on the trace data. These xtree data structures are then utilized to create a minimum xtree data structure for that build of the computer program.

This same process is repeated for a different build of the computer program. That is, multiple traces of the execution of a second build of the computer program are performed in order obtain xtree data structures for each trace of the second build of the computer program. These xtree data structures are then utilized to obtain a minimum xtree data structure for the second build of the computer program.

In this way, the "noise" is eliminated from the traces of the first and second builds of the computer program. Thus, only those portions of code in the traces of the execution of each of the first and second builds that appreciably and consistently affect the execution of the computer program are maintained in the minimum xtree data structures for each build.

The minimum xtree data structures for each build are then subtracted from one another in order to identify the differences. This subtraction is performed in the same manner as discussed above. By performing this subtraction, differences between the builds are highlighted. These differences may be compared to thresholds so that when a difference exceeds a threshold, e.g., a cumulative value for a method exceeds a particular threshold, an alert and message may be generated and reported to an analyst.

In addition, this performance regression processing may be performed between more than two builds of a computer program. That is, the operations discussed above may be repeated for each pair of builds in order to determine how transitioning from one build to the next affects the overall execution of the computer program.

The above embodiments are preferably implemented in an automatic manner. That is, human intervention is not necessary to initiate and perform the operations of tree-subtraction, tree-addition, minimum tree processing, or performance regression processing. To the contrary, upon obtaining a plurality of traces of the same or different builds, the various operations that are enabled on a computing system may be automatically initiated so as to generate the appropriate xtree data structures for use by a human analyst in analyzing the execution of one or more builds of the computer program. In addition, these operations may be performed individually or in any combination to generate all of the information that may be of interest to the human analyst.

Figure 20:
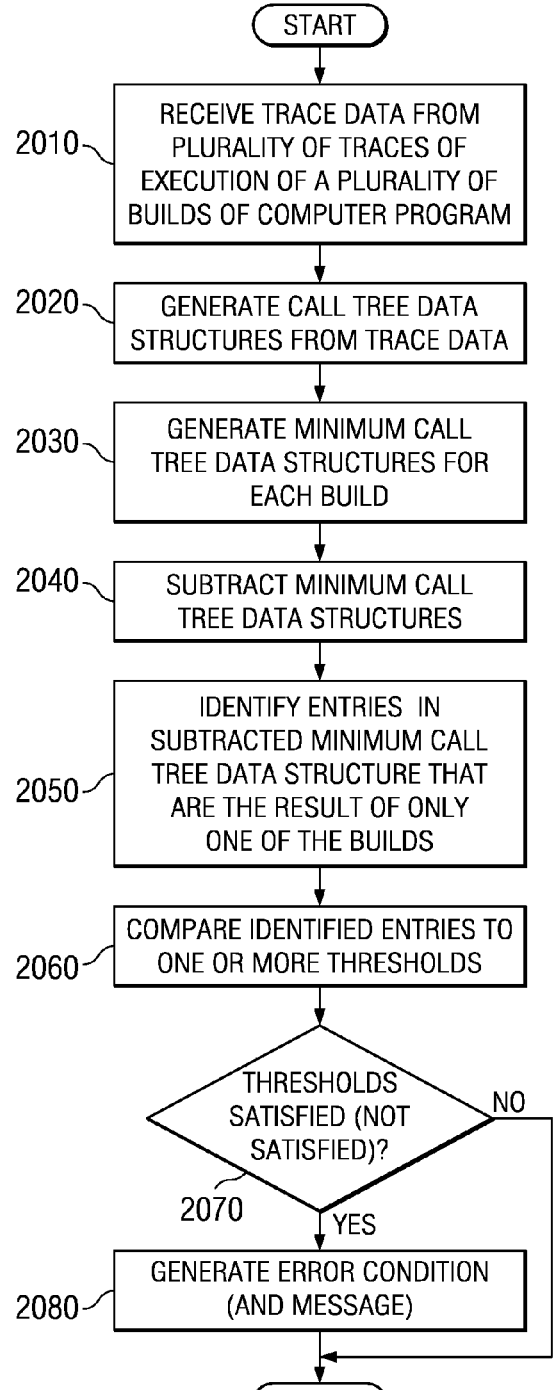
FIG. 20 is a flowchart outlining an exemplary operation of the present invention when performing autonomic performance regression processing.

FIG. 20 is a flowchart outlining an exemplary operation of the present invention when performing autonomic performance regression processing. As shown in FIG. 20, the operation starts by receiving trace data from a plurality of traces of the execution of the two or more different builds of a computer program (step 2010). Thereafter, the trace data is input to an arcflow tool to obtain call tree data structures, e.g., xtree data structures, for each execution of the computer program (step 2020). Thereafter, for each set of call tree data structures for each build, a minimum call tree data structure is generated (step 2030). The resulting minimized call tree data structures are then subtracted from one another to generate a subtracted minimum call tree data structure (step 2040).

Entries in the subtracted minimum call tree data structure that are the result of only one of the builds are then identified (step 2050). The values associated which these entries are compared to one or more thresholds (step 2060). A determination is then made as to whether any of the thresholds are satisfied or not satisfied, depending on the particular embodiment, e.g., are met or exceed (or conversely, not met or exceeded) (step 2070). If the thresholds are satisfied or not satisfied, depending on the situation, an alert and message may be output to a human analyst (step 2080). Other alternative methods for alerting may be used, such as changing display formats, colors, and the like. The operation then terminates.

Thus, in this additional embodiment of the present invention, changes between builds that will consistently and appreciably affect runs of the computer program are identified. In addition, those changes that may be the result of errors or unwanted conditions within the execution of the computer program are automatically identified. In this way, the analyst's attention is focused on areas of the computer program that may be optimized to obtain a consistently better execution of the computer program.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a non-transitory data processing system, for automatically identifying performance regression between builds of a computer program based on trace data obtained from a plurality of executions of a first and second build of a computer program, comprising:

obtaining a plurality of call tree data structures corresponding to trace data for the plurality of executions of the first and second builds of the computer program;

generating a minimized call tree data structure from the plurality of call tree data structures for each of the first and second builds of the computer program, wherein the minimized call tree data structure includes a minimum set of nodes that are consistent between the plurality of call tree data structures;

subtracting a second minimized call tree data structure for the second build of the computer program from a first minimized call tree data structure for the first build of the computer program to thereby generate a subtracted minimized call tree data structure, wherein the subtracted minimized call tree data structure comprises a node having a negative minimum base value for each node that exists in only one of the first minimized call tree data structure or the second minimized call tree data structure, wherein the negative minimum base value is a minimum base value of a node that exists in only one of the first minimized call tree data structure or the second minimized call tree data structure; and outputting the subtracted minimized call tree data structure.

2. The method of claim 1, further comprising:

inputting the trace data to an arcflow tool, wherein the arcflow tool generates the plurality of call tree data structures for each of the first and second builds of the computer program based on the trace data.

3. The method of claim 1, wherein the plurality of call tree data structures for each of the first and second builds of the computer program are xtree data structures.

4. The method of claim 1, wherein generating a minimized call tree data structure includes:

copying a first call tree data structure for a selected build of the computer program; and walking a second call tree data structure for the selected build of the computer program over the first call tree data structure to generate the minimized call tree data structure.

5. The method of claim 4, wherein walking the second call tree data structure over the first call tree data structure includes:

for each node that exists in both the first call tree data structure and the second call tree data structure, generating a node in the minimized call tree data structure and associating values with the node.

6. The method of claim 5, wherein the values associated with the node are values that correspond to the minimum of the values associated with corresponding nodes in the first call tree data structure and the second call tree data structure.

7. The method of claim 4, wherein walking the second call tree data structure over the first call tree data structure includes:

for each node that exists in only one of the first call tree data structure and the second call tree data structure, inhibiting creating a node in the minimum call tree data structures.

8. The method of claim 1, wherein subtracting the second minimized call tree data structure for the second build from the first minimized call tree data structure for the first build to generate the subtracted minimized call tree data structure includes:

copying the first minimized call tree data structure for the first build; and walking the second minimized call tree data structure for the second build over the first minimized call tree data structure for the first build to generate the subtracted minimized call tree data structure.

9. The method of claim 8, wherein walking the second minimized call tree data structure for the second build over the first minimized call tree data structure for the first build includes:

for each node that exists in both the first minimized call tree data structure for the first build and the second minimized call tree data structure for the second build, generating a node in the subtracted minimized call tree data structure by subtracting a minimum base value of the node in the minimized call tree data structure for the second build from a minimum base value of a corresponding node in the minimized call tree data structure for the first build.

10. The method of claim 8, wherein walking the second minimized call tree data structure for the second build over the first minimized call tree data structure for the first build includes:

for each node that exists in only one of the first minimized call tree data structure for the first build and the second minimized call tree data structure for the second build, creating a node in the subtracted minimized call tree data structure having a negative minimum base value corresponding to a minimum base value of the node that exists in either of the first minimized call tree data structure for the first build or the second minimized call tree data structure for the second build.

11. The method of claim 1 wherein the subtracted minimized call tree data structure comprises a node having a difference minimum base value for each node that exists in both the first minimized call tree data structure and the second minimized call tree data structure, wherein the difference minimum base value is a difference between a minimum base value of a node in the first minimized call tree data structure and a minimum base value of a corresponding node in the second minimized call tree data structure.

* * * * *